United States Statutory Invention Registration [19]

[11] Reg. Number: H982

Berggren et al. [43] Published: Nov. 5, 1991

[54] METHOD FOR PREPARING POLYMERIC MEMBRANES IN-SITU AND AN APPARATUS FOR PERFORMING THIS PROCESS

[76] Inventors: Mark A. Berggren, 6233 Haskell, Houston, Tex. 77007; Lance M. Garton, 7610 Miller Glen La., Houston, Tex. 77072

[21] Appl. No.: 453,871

[22] Filed: Dec. 20, 1989

[51] Int. Cl.[5] ..... B29C 63/00; B32B 31/00; B05D 3/12; B28B 1/00

[52] U.S. Cl. ..... 264/171; 264/36; 156/279; 156/275.1; 427/355; 427/356; 427/362; 425/62; 425/87; 425/204; 425/376.1

[58] Field of Search ..... 264/171, 36; 156/279, 156/275, 71; 427/186, 355, 356, 362; 425/62, 87, 204–209, 376.1

[56] References Cited

U.S. PATENT DOCUMENTS

| | | | |
|---|---|---|---|
| 1,829,479 | 10/1931 | Elkins | 425/87 |
| 1,831,779 | 11/1931 | MacDonald | 425/209 |
| 2,273,599 | 2/1942 | Smith et al. | 425/62 |
| 2,538,465 | 1/1951 | Marco | 425/376.1 |
| 2,718,684 | 9/1955 | Bjorksten | 425/378.1 |
| 3,113,986 | 12/1963 | Breslow et al. | 260/683.9 |
| 3,345,316 | 10/1967 | Nielsen | 260/28.5 |
| 3,605,217 | 9/1971 | Martens et al. | 425/192 R |
| 3,664,781 | 5/1972 | Widman | 425/68 |
| 3,878,014 | 4/1975 | Melead | 156/167 |
| 3,937,640 | 2/1976 | Tajima et al. | 427/186 |
| 4,000,140 | 12/1976 | Tierney | 260/28.5 |
| 4,032,491 | 6/1977 | Schoenke | 260/28.5 |
| 4,073,673 | 2/1978 | Raabe et al. | 264/171 |
| 4,081,502 | 3/1978 | Blumel et al. | 264/140 |
| 4,087,309 | 5/1978 | Lang | 156/579 |
| 4,193,898 | 3/1980 | Miller | 427/186 |
| 4,226,952 | 10/1980 | Halasa et al. | 525/192 |
| 4,239,581 | 12/1980 | Lang | 156/579 |
| 4,545,847 | 10/1985 | Schneller | 425/87 |
| 4,589,804 | 5/1986 | Paeglis et al. | 156/71 |
| 4,761,201 | 8/1988 | Nichols, Jr. | 156/497 |

*Primary Examiner*—Robert L. Stoll
*Assistant Examiner*—C. Harris

[57] ABSTRACT

A process is provided which produces a waterproof membrane and applies this waterproof membrane directly to a fixed substrate. The process includes the steps of providing a polymeric material; melting the polymeric material; forcing the melted polymeric material through a movable die, the movable die shaping the polymeric material melt into a film; moving the movable die across the fixed substrate; and applying the film directly to the fixed substrate forming a waterproof membrane. The polymeric material is one of those known in the art to be useful as roofing material. In a preferred embodiment, this process produces a sealing membrane which is applied to a roof of a structure forming a membrane effective to protect the structure from intrusion of water. In another aspect, an apparatus is provided which is capable of performing the process of this invention.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PREPARING POLYMERIC MEMBRANES IN-SITU AND AN APPARATUS FOR PERFORMING THIS PROCESS

BACKGROUND OF THE INVENTION

This invention relates to a process for applying a polymeric film to a fixed substrate and an apparatus suitable for performing this process. In a preferred embodiment, this invention relates to an apparatus for applying an extruded polymeric film to a roof as a sealing membrane.

Built-up roofing has long been used as a means of providing sealing membranes for roofs. Typically, built-up roofing is applied by applying alternating layers of felt and hot bitumen, and sealing the membrane with an additional layer of mopped hot bitumen. Three layers of felt are typically utilized. A layer of gravel or other aggregate is then laid on top of the bitumen to protect the membrane from environmental effects such as wind and sunlight, and to improve the appearance of the roof. Built-up roofing is heavy, and the application of the roof is labor intensive and and therefore relatively expensive to install.

Because of the shortcomings of built-up roofing, prefabricated roll roofing material has been developed. Commonly used prefabricated roll roofing material are fabricated from bitumen modified with atactic polypropylene ("APP"), bitumen modified with styrene-butadiene rubber, ethylene-propylene copolymer modified asphalt and vulcanized EPDM. These materials are usually reinforced with mats made of fabric, fiberglass or polyester. The rolls are usually "dusted" with sand or talc, or a release paper is applied to prevent the material from fusing together during storage. Shortcomings of these systems include poor adhesion to the roof and adjacent prefabricated roll roofing material and the need to remove the talc, sand or release paper before installation. Further, although labor required to install these prefabricated roof materials is not as great as built-up roofing a system which could be installed using less labor is desirable.

Prefabricated membranes are held in place by using an adhesive, mechanically fastening to the roof or by ballast. Application of adhesives is labor intensive and slow. Mechanically fastening the roofing material results in concentrated stress due to differential thermal expansion and movement of the roof. These concentrated stresses can result in tears which then allow water intrusion. Ballast is heavy and is subject to being moved by wind and foot traffic.

Another method of holding in place prefabricated roofing material involves using oxidized bitumen as an adhesive. This method is commonly used with styrene-butadiene rubber modified bitumen roll roofing material. The oxidized bitumen is melted and spread using an industrial mop. Variations is the thickness of the mopped layer, the temperature of the oxidized bitumen when it is applied and the chemical consistency of the asphalt result in variations in the adhesion. Transporting the molten oxidized bitumen to the roof is also difficult.

Prefabricated roll roofing made from APP modified bitumen is typically held in place by "welding" the compositions to the substrate and adjacent roofing material by partially melting the roll. Partially melting the roll roofing material is often accomplished using an open flame. Welding is difficult if not impossible to accomplish evenly, resulting in flaws which can allow water intrusion. The use of an open flame with the roll roofing material, which is itself flammable, is hazardous and has been the cause of many serious structural fires.

An apparatus intended to unroll, heat, and press into place rolled roofing is described in U.S. Pat. No. 4,761,201. In this apparatus, a series of burners is positioned in a frame, with each burner pointing toward a roll of roofing material which is capable of heating the roll of roofing material. The frame supports the burners and the roll of roofing material so that the roll may be unrolled with the full weight of the roll pressing the heated roll onto the roof substrate. The apparatus includes a manually adjustable pivoted bracket to hold the burners at a predetermined distance from the roll of roofing material. This is necessary due to the decreasing diameter of the roll as it is unrolled. Although this apparatus provides a means to apply rolls of roofing material, many shortcomings are evident. The manual adjustment of the distance from the burners to the roll is subject to human error, and even if operated flawlessly, the evenness of the heating is also dependent on the evenness of the rate that the apparatus is moved across the substrate. The apparatus also requires that open flames be directed at the roll of roofing material, which is is vary undesirable, as discussed above.

The optimum composition and thickness of a sealing membrane for a roof will vary according to the amount of insulation under the roof, the roof's slope, local climate, ambient conditions at the time of application, exposure to sunlight, exposure to wind, desired color and appearance and several other such factors. Prefabricated rolls of roofing material cannot be made in such a variety of compositions that a near optimum roof system can be applied consistently. A system for applying water proof membranes which allows for adjustments for some or all of these conditions is not currently available.

Membranes similar to roof membranes are utilized in other applications. For example, stress absorbing membrane interlayers are applied between layers of road materials to prevent cracks caused by differential expansion of the layers. Rolled membranes of bituminous material on polyester reinforcement mats are often used in these applications, and suffer from many of the shortcomings described above for roofing materials.

It is therefore an object of the present invention to provide a process to apply a sealing membrane to a fixed substrate wherein the thickness of the membrane is determined in-situ, wherein an open flame is not required at the point of application for application of the sealing membrane to the fixed substrate and wherein hot bitumen is not required as an adhesive. In a preferred embodiment of the present invention, it is an object to provide a process to apply a sealing membrane to a fixed substrate wherein the composition can be determined in-situ. In another aspect, it is an objective of this invention to provide an apparatus capable of performing the process described above.

SUMMARY OF THE INVENTION

A process is provided which produces a polymeric waterproof sealing membrane and applies this polymeric membrane directly to a fixed substrate. The process comprises the steps of providing a polymeric material; melting the polymeric material; forcing the melted polymeric material through a movable die, the die shaping the melted polymeric material into a film; moving the die across the fixed substrate: and applying the film directly to the fixed substrate forming a polymeric waterproof sealing membrane. The polymeric material is one of those known in the art to be useful as roofing material usually comprising a major portion of elastomeric engineering thermoplastic, and optionally a minor portion of bitumen, fillers, antioxidants, pigments, natural resins, synthetic resins, blowing agents, and other additives known in the art to be useful in sealing membranes. In a preferred embodiment, this process produces a polymeric weatherproof sealing membrane which is applied to a roof of a structure forming a membrane effective to protect the structure from intrusion of water. Because the film is applied to the fixed substrate in a molten state, it adheres better to substrates, fills cracks, and welds to previously layered films without the need to mop molten material over the film, and without the need to apply additional heat to the film after application.

In another embodiment, this process produces a stress absorbing membrane which is useful between layers of road material; or between other ridged layers of material.

In another aspect, an apparatus is provided which is capable of performing the process of this invention. The apparatus comprises a means for increasing the pressure of the polymeric material having a low pressure inlet and a high pressure outlet; a means for feeding polymeric material into the low pressure inlet; a means for heating the polymeric material to a temperature sufficiently high to provide a melt of the polymeric material at the high pressure outlet of the means for increasing the pressure of the polymeric material; a die at the high pressure outlet which is capable of shaping molten polymeric material into the shape of a film; and a means for moving the die's outlet over the surface of a fixed substrate to which the molten polymeric material film is to be applied. This apparatus is mobile and capable of moving over a fixed substrate as a film of molten polymeric material is forced out of the die.

In the preferred embodiment, the polymeric waterproof sealing membrane is applied to the roof of a structure to protect the structure from the intrusion of water.

DETAILED DESCRIPTION OF THE INVENTION

Figure 1:
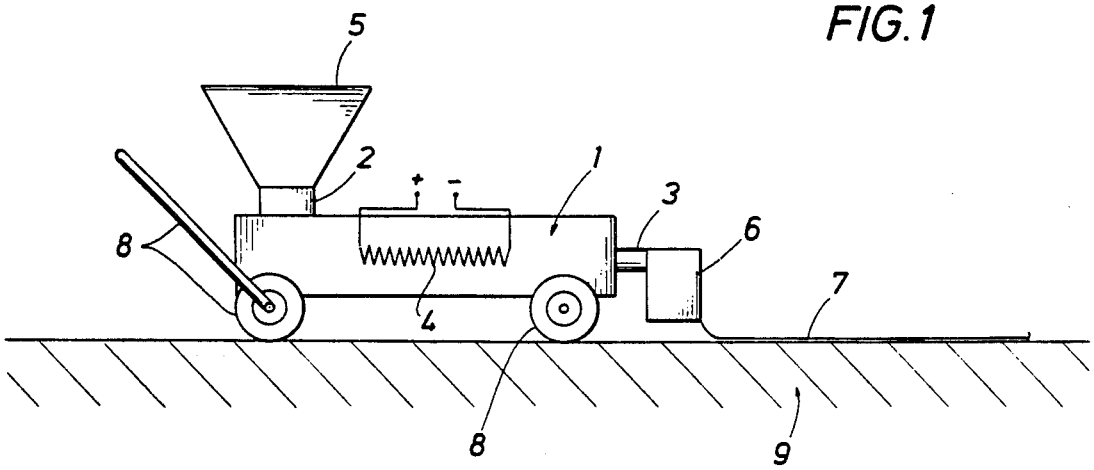
FIG. 1 is a profile view of the apparatus of this invention.

The suitable polymeric material of this invention may be any of those polymeric materials which are known in the art as suitable for use in roofing membranes. Bitumen is often used as a roofing membrane material, but when used alone, has shortcomings. In particular, bitumen flows at high temperatures and is brittle at low temperatures. Unmodified bitumen is also difficult to extrude. Bitumen may therefore be utilized as the polymeric material of this invention, but when bitumen is utilized it is preferably modified with elastomeric polymers to improve elasticity, low temperature flexibility, high temperature strength and extrudability. A suitable modified bitumen is taught by Nielsen in U.S. Pat. No. 3,345,316, and by van Beem, in U.S. Pat. No. 3,978,014, which are incorporated herein by reference. A roofing sealing membrane composition which is mostly polymeric is most preferred as the polymeric material of this invention, such as that described by Schoenke in U.S. Pat. No. 4,032,491, and by Tierney in U.S. Pat. No. 4,000,140, which are incorporated herein by reference. A process to produce granules of a blend of bitumen and polymer is taught in U.S. Pat. No. 4,081,502, which is incorporated herein by reference.

Chlorosulfonated polyethylene is also suitable as the polymeric material of this invention. Chlorosulfonated polyethylene is produced by E. I. DuPont de Nemours & Co. under the trade name Hypalon ®.

Polymeric compositions comprising elastomeric engineering thermoplastics are preferred because, being reprocessable, the waste extrudate may be reused, reducing the material costs of the membrane. A most preferred elastomeric engineering thermoplastic is an elastomeric block copolymer comprising at least one block which comprises predominantly conjugated diolefin monomer units and at least two blocks which comprise predominantly vinyl arene monomer units. By predominantly, it is meant that the blocks will be 85 percent by weight, or greater, of the type of monomer units characterizing that block. These block copolymers are preferably hydrogenated, because hydrogenation of ethylenic unsaturation significantly increases oxidative stability and stability when exposed to ultraviolet radiation. These block copolymers are most preferred because of their excellent elastomeric properties, their compatibility with bitumens and their engineering thermoplastic characteristics which allows reuse of scrap extrudate.

The elastomeric block copolymer may be prepared by anionic polymerization utilizing a lithium alkyl initiator and sequential addition of monomers followed by termination by addition of alcohol or water or coupling by addition of carbon dioxide or other divalent coupling agents, or coupling into a star shape by adding such coupling agents as divinyl benzene.

Hydrogenation of the elastomeric block copolymer may be accomplished by use of the method taught in U.S. Pat. No. 3,113,986 and 4,226,952, which are incorporated herein by reference. Ethylenic unsaturation of the elastomeric block copolymer is preferably reduced by hydrogenation to less than 20% of original ethylenic unsaturation and more preferably to less than 5% of original ethylenic unsaturation.

Useful elastomeric block copolymers are from about 5 to about 50 percent by weight vinyl arene, more preferably from about 20 to about 35 percent by weight. Preferable elastomeric copolymers have, before hydrogenation, a 1,2 addition microstructure of between about 20 and about 80 weight percent and most preferably between about 35 and about 40 weight percent.

Molecular weights of elastomeric block copolymers useful in this invention range from about 25,000 to about 2,000,000. When star shaped polymers are utilized, higher molecular weights can be utilized. When linear polymers are utilized, molecular weights between about 50,000 and about 150,000 are preferred.

A most preferred elastomeric block copolymer is a hydrogenated polystyrene-polybutadiene-polystyrene block copolymer.

The polymeric material composition comprising an elastomeric block copolymer may further comprise plasticisers, such as a paraffinic or naphthenic mineral oil, fillers, pigments, stabilizers, such as carbon black, titanium oxide, calcium carbonate or talc, thixotripic agents, antioxidants, and flame retardant agents. The polymeric material may also comprise a bitumen, polyoleiins, polystyrene or other polymers. Polystyrene having a number average molecular weight of about the number average molecular weight of the polyvinyl arene blocks of the elastomeric block copolymer are also known to be advantageous components of bitumen-elastomeric block copolymer compositions, and could be incorporated in the polymeric compositions of the present invention.

The polymeric materials preferably comprise more than about 30 percent by weight of the elastomeric block copolymer of a vinyl arene and a conjugated diolefin, and more preferably more than 60 percent by weight of this elastomeric block copolymer.

The means for increasing the pressure of the polymeric material and the means for heating the polymeric material may be provided by an extruder. Low pressure melting and then increasing the pressure of the melt using a pump or other appropriate means is also encompassed by this invention. A conventional single screw or twin screw extruder is preferred because they provide a continuous and consistent flow of material to the die and can rapidly melt the polymeric mass and simultaneously increase the pressure of the polymeric mass to a pressure sufficient to force the material through a suitable film die. For convenience, the means for increasing the pressure and the means for heating the polymeric material will be referred to herein as an extruder, although it will be understood that other means of increasing the pressure and heating are included.

The means for melting the polymeric material preferably heats the polymeric material to between 250° F. and 650° F. and more preferably to between 450° F. and 550° F. The means to increase the pressure of the polymeric material preferably increases the pressure to over 100 psig.

Figure 2:
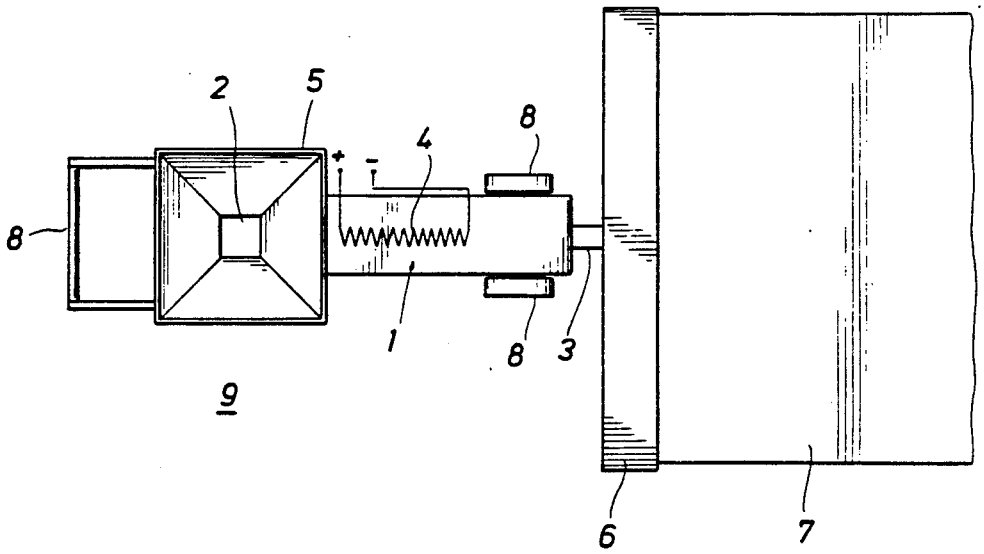
FIG. 2 is a top view of the apparatus of this invention.

In FIGS. 1 and 2 an extruder 1, with a low pressure inlet 2, and a high pressure outlet 3 and an electrical resistance as a means for heating the contents of the extruder 4, is shown.

Figure 3:
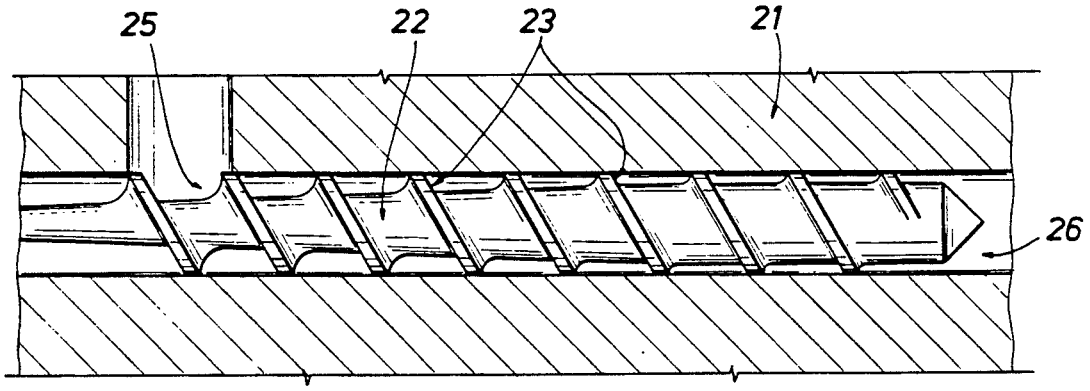
FIG. 3 is a cross section of an extruder which could be utilized as the extruder of this invention.

The single screw extruder is illustrated in FIG. 3. The single screw extruder comprises a hollow cylinder 21 in which an archimedean screw 22, having vanes 23, transports softened polymeric material 24 from the low pressure inlet 25 to the high pressure outlet 26. Either the pitch of the vanes on the archimedean screw is increased or the channel depth of the screw is decreased along the length of the screw in order to increase the pressure on the softened polymeric material as the screw rotates. FIG. 3 shows an archimedean screw in which the pressure of the melted polymeric material is increased by decreasing the channel depth. The cylinder walls are heated to provide heat input into the softened polymeric mass flowing through the extruder.

In a preferred embodiment, a means for mixing the polymeric material after the polymeric material is melted and before it enters the movable die is provided. This allows the polymeric material which is fed to the extruder to be a mixture which has not been previously blended. The composition of the polymeric material can then be determined at the time of the application of the sealing membrane, taking into account the many variables which dictate the optimum composition of the sealing membrane. A twin screw extruder is an example of an extruder which includes a means for mixing the polymeric material.

If a low pressure method to melt the polymeric material is utilized, a means must be provided to increase the pressure of the melted polymeric material through the die to form a film of the polymeric melt. A positive displacement pump is preferred as the means to increase the pressure of the melted polymeric material. Centrifugal pumps may be used, but are not preferred due to the difficulty of using a centrifugal pump on a fluid as viscous as the melt of this invention.

Any method for transporting solids known in the art may be utilized as the means for feeding the polymeric material into the low pressure inlet of the extruder. Means for feeding polymeric material into the low pressure inlet may be a hopper into which pellets are manually poured, the pellets flowing by gravity into the low pressure inlet. Alternatively, pellets may be pneumatically conveyed from a remote location to the low pressure inlet.

In FIGS. 1 and 2, a hopper 5 is shown as the means for feeding polymeric material into the low pressure inlet.

The die which the polymeric melt is forced through to form a film of the melt has a gap of in the range of one to about 1000 mils, and preferably a gap in the range of about 30 to about 250 mils. The width of the die is not critical, and can vary from a one inch to about six feet. The wider the die is, the fewer passes will have to be made to cover a fixed substrate with the sealing membrane of this invention, but an excessively wide die will require an excessively large extruder, polymeric material feed handling system and source of power. These requirements are inconsistent with providing a highly mobile system for applying a sealing membrane to a fixed substrate in-situ which is required to achieve the objectives of the present invention.

The die is preferably positioned to be in close proximity to the fixed substrate to which the sealing membrane is to be applied. It is also preferred that the film of the melt be applied to the fixed substrate before the film has cooled significantly from the temperature of the melt at the die. This maximizes the adhesion to the fixed substrate and to previously applied sealing membrane. It is preferred that the die be in the range of about one to about 24 inches from the fixed substrate to which the sealing membrane is being applied and it is most preferred that the die be in the range from about three inches to about eight inches from the fixed substrate to which the membrane is being applied. It is preferred that the melt film from the membrane fall into the membrane from the die by gravity with the fixed substrate being below the die. Methods to press the film to the fixed substrate with air pressure, rollers, or brushes are also contemplated.

In FIGS. 1 and 2, the die 6 is shown and a film 7 which has been formed by the die is shown.

A means for moving the die across the fixed substrate as the film of the melt is applied is an essential element of the apparatus to perform the process of the present invention. It is preferred that the die be moved in a direction perpendicular to the width of the die, and be moved at a rate of speed approximating the speed of the film melt coming out of the die.

In FIGS. 1 and 2, means for moving the die across the fixed substrate 8 is shown as wheels and a handle for manually pulling the die across the fixed substrate 9. Other alternatives include motor driven wheels, or wenches pulling the apparatus across the substrate.

The movable die portion of the apparatus and preferably the extruder plus the movable die must be portable and readily movable. Being portable and readily movable, the apparatus can be brought to a job site where a weatherproof sealing membrane is to be installed. The membrane can then be extruded and applied in a single operation, resulting in a clean, light, flexible sealing membrane.

When the present invention is utilized as a roofing system, many advantages over the prior art are apparent. The apparatus of the present invention is small enough to be hoisted to the roof or even brought to the roof by elevators. The apparatus is light enough to be safely supported by typical roofs. Transportation of hot bitumen to the roof, which is difficult, messy and can be unsafe, is not required. Less labor is required, and open flames are not required on the roof.

It is contemplated that multiple overlapping passes of the die over a fixed substrate may be required in order to provide a sealing membrane for the entire fixed substrate. It is contemplated that these passes will be made so that the film melt being applied overlaps the previously laid membrane and, being a melt, will adhere to it without a need for torch welding or applying additional material to seal the joint.

The fixed substrate of the present invention is preferably a roof of a structure, but other substrates are included. By fixed, it is meant that the die is moved across the substrate rather than the substrate moved under the die. The fixed substrate can therefore be a boat, mobile home, or vehicle.

The process of this invention produces a polymeric waterproof sealing membrane suitable for sealing a roof, and suitable as a stress absorbing interlayer between layers of road materials. The membrane is laid in a single operation, and does not require torch welding of the strips of the membrane, or mopping of sealing material over the membrane. The membrane is inherently uniform in thickness, and therefore minimizing excess usage of material. In the preferred embodiment wherein an elastomeric engineering thermoplastic is utilized as the polymeric material of this invention, the scrap extrudate may be reused, allowing further reductions in the amount of raw material required. The membrane of the present invention is light, flexible, can be installed with less labor than prior art sealing membranes and does not require an adhesive to seal joints between adjacent strips of membrane. The preferred embodiment incorporating an extruder comprising a means to mix the polymeric material allows the membrane composition to be varied based on the numerous variables known to effect the optimum composition of the membrane. The thickness of the membrane could also be varied for the particular application for different portions of that application.

We claim:

1. A process to produce a polymeric waterproof sealing membrane and adhere it to the roof of a structure, the process comprising the steps of:

(a) providing a polymeric waterproof sealing material on the roof;

(b) melting the polymeric material on the roof;

(c) forcing the melted polymeric material through a light movable die, located on the roof, wherein the die shapes the meld into a film;

(d) positioning the movable die in close proximity to the roof and moving the movable die across the roof; and (e) applying the film melt directly to the roof before the film melt has cooled significantly from the temperature of the melt at the movable die.

2. The process of claim 1 wherein the melting of the polymeric material is performed in a single screw extruder.

3. The process of claim 1 wherein the melting of the polymeric material is performed in a twin screw extruder.

4. The process of claim 1 wherein the movable die has a width in the range of from about one to about 72 inches.

5. The process of claim 1 wherein the polymeric material comprises more than 30 percent by weight of a block copolymer comprising at least one block comprising predominantly polymerized conjugated diolefins and at least two blocks comprising predominantly polymerized vinyl aromatics.

6. The process of claim 1 wherein the polymeric material comprises more than 60 percent by weight of a block copolymer comprising at least one block comprising predominantly polymerized conjugated diolefins and at least two blocks comprising predominantly polymerized vinyl aromatics.

7. The process of claim 6 wherein the block copolymer is hydrogenated to reduce ethylenic unsaturation to less than 10% of the original ethylenic unsaturation.

8. The process of claim 6 wherein the block copolymer is selectively hydrogenated to reduce the ethylenic unsaturation to less than 10% or original ethylenic unsaturation while retaining greater than 90% of the original aromatic unsaturation.

9. A light portable apparatus for applying a sealing membrane directly onto the roof of a structure, the apparatus comprising:

(a) a light means for melting polymeric material;

(b) a light means for increasing the pressure of polymeric material comprising a low pressure inlet and a high pressure outlet;

(c) a light means for feeding polymeric material into the low pressure inlet of the means for increasing the pressure of the polymeric material;

(d) a light movable die connected to the high pressure outlet capable of forming the melted polymeric material into a film and positioned in close proximity to the roof; and (e) a light means for moving the die over the roof of a structure so the melted polymeric film falls onto the roof as it exits the die before the film has cooled significantly from the temperature of the melted polymeric material at the die.

10. The apparatus of claim 19 wherein the means for increasing the pressure of the polymeric material and the means for melting the polymeric material is a single screw extruder.

11. The apparatus of claim 9 wherein the means for increasing the pressure of the polymeric material and the means for melting the polymeric material is a twin screw extruder.

12. The apparatus of claim 9 wherein the means for feeding polymeric material into the low pressure inlet is a feed hopper from which polymeric material flows by gravity into the low pressure inlet.

13. The apparatus of claim 9 wherein the means for moving the movable die over the roof comprises wheels and handles which permit manual movement of the entire apparatus.

14. The apparatus of claim 9 wherein the means for moving the movable die over the roof comprises a means for moving the die at a rate approximating :he rate at which the polymeric material exits the movable die.

15. The apparatus of claim 9 wherein the means for adding heat to the polymeric material is capable of increasing the temperature of the polymeric material so that, at the movable die, the temperature of the polymeric material is in the range of from about 250° F. to about 650° F.

16. The apparatus of claim 9 wherein the apparatus is mounted on two or more wheels.

17. The apparatus of claim 16 wherein the movable die extends from the center line of the apparatus laterally for a distance, parallel to the roof and approximately perpendicular to the direction of movement of the apparatus over the roof in at least one direction for a distance which exceeds the distance of the outer rim of the outermost wheel.

18. The apparatus of claim 9 wherein the movable die has a gap in the range of from about one mil to about 1000 mils.

19. The apparatus of claim 9 wherein the movable die has a gap in the range of from about 30 mils to about 250 mils.

20. The apparatus of claim 9 wherein the movable die has a width in the range of from about one inch to about 72 inches.

* * * * *